(12) United States Patent
Wu et al.

(10) Patent No.: US 11,902,951 B2
(45) Date of Patent: Feb. 13, 2024

(54) OPTIMIZED COMPONENT CARRIER ACTIVATION AND DEACTIVATION

(71) Applicant: QUALCOMM Incorporated, San Diego, CA (US)

(72) Inventors: Yongle Wu, San Diego, CA (US); Alexei Yurievitch Gorokhov, San Diego, CA (US); Heechoon Lee, San Diego, CA (US); Jong Hyeon Park, San Jose, CA (US); Kang Yang, San Diego, CA (US); Scott Hoover, Del Mar, CA (US); Yann-Cheng Lin, San Diego, CA (US); Antriksh Pany, San Diego, CA (US); Mingxia Cheng, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 17/449,512

(22) Filed: Sep. 30, 2021

(65) Prior Publication Data
US 2023/0093843 A1  Mar. 30, 2023

(51) Int. Cl.
*H04W 72/0453* (2023.01)
*H04L 5/00* (2006.01)
*H04W 72/231* (2023.01)

(52) U.S. Cl.
CPC ......... *H04W 72/0453* (2013.01); *H04L 5/001* (2013.01); *H04L 5/0098* (2013.01); *H04W 72/231* (2023.01)

(58) Field of Classification Search
CPC .. H04L 5/001; H04L 5/0098; H04W 72/0453; H04W 72/231
See application file for complete search history.

(56) References Cited

U.S. PATENT DOCUMENTS

| | | | |
|---|---|---|---|
| 6,122,744 A * | 9/2000 | Rashkovskiy | G06F 1/32 713/300 |
| 9,408,121 B2 * | 8/2016 | Xiao | H04B 17/318 |
| 2013/0109295 A1 * | 5/2013 | Lipowski | H04N 21/4383 455/3.04 |
| 2017/0272108 A1 * | 9/2017 | Filipovic | H04B 1/0458 |

(Continued)

FOREIGN PATENT DOCUMENTS

| | | | | |
|---|---|---|---|---|
| WO | WO-2008130410 A1 * | 10/2008 | | H04L 12/5695 |
| WO | 2022047221 | 3/2022 | | |

OTHER PUBLICATIONS

International Search Report and Written Opinion—PCT/US2022/074664—ISA/EPO—dated Nov. 14, 2022.

*Primary Examiner* — Kevin C. Harper
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive, from a base station, configuration information indicating a set of component carriers (CCs) associated with the UE. The UE may receive, from the base station, a message that activates or deactivates one or more CCs of the set of CCs. The UE may communicate, with the base station, after receiving the message, using one or more activated CCs of the set of CCs over a tuned radio frequency (RF) bandwidth that is based on receiving the message and based on the one or more activated CCs. Numerous other aspects are provided.

26 Claims, 7 Drawing Sheets

(56) References Cited

U.S. PATENT DOCUMENTS

2018/0007731 A1\* 1/2018 Park .................. H04L 5/001
2019/0124558 A1 4/2019 Ang et al.
2022/0330038 A1\* 10/2022 Ganesan ............. H04W 52/10

\* cited by examiner

OPTIMIZED COMPONENT CARRIER ACTIVATION AND DEACTIVATION

FIELD OF THE DISCLOSURE

Aspects of the present disclosure generally relate to wireless communication and specifically, to techniques and apparatuses for optimized component carrier (CC) activation and deactivation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some examples, components of a user equipment (UE) may be tuned or configured to transmit, receive, or process signals at a desired frequency. For example, filters, mixers, splitters, amplifiers, phase shifters and other components may be tuned or configured to receive, transmit, or process signals at a desired frequency (or frequency range). For example, components of the UE may be tuned or configured to transmit, receive, or process radio frequency (RF) signals at a desired frequency or frequency range. In some cases, components of the UE may be tuned or configured to transmit, receive, or process RF signals and baseband signals using different frequencies or different frequency ranges (for example, using a first frequency range for RF signals and a second frequency range for baseband signals). In some examples, the UE may tune or configure components based on the component carriers (CCs) configured for the UE. For example, a radio resource control (RRC) configuration may indicate a set of CCs that span a range of frequencies. Based on receiving the RRC configuration, the UE may tune or configure components of the UE to transmit, receive, or process RF signals over the range of frequencies associated with the RRC-configured CCs.

In some such examples, the UE may configure or tune an RF bandwidth to cover the frequency range associated with all of the RRC-configured CCs (for example, to ensure that the UE is capable of transmitting, receiving, or processing RF signals associated with all RRC configured CCs). However, transmitting, receiving, or processing RF signals associated with all RRC configured CCs would consume significant power resources of the UE. As such, in some examples, fewer than all CCs, of the RRC-configured CCs, may be activated at a given time. For example, in some cases, data may be communicated on only a subset of the RRC-configured CCs (for example, because some of the RRC-configured CCs may be deactivated). As a result, the RF bandwidth of the UE may be tuned to be wider than needed to communicate data on the activated CCs, which consumes additional power resources as compared to tuning or configuring the components to transmit, receive, or process RF signals over a narrower range of frequencies. For example, tuning or configuring components of the UE to transmit, receive, or process RF signals over a wider range of frequencies consumes additional power resources for analog-to-digital conversion, wideband processing, narrowband processing, or other operations associated with transmitting, receiving, or processing RF signals.

SUMMARY

Some aspects described herein relate to a user equipment (UE) for wireless communication. The user equipment may include at least one processor and at least one memory, communicatively coupled with the at least one processor, that stores processor-readable code. The processor-readable code, when executed by the at least one processor, may be configured to cause the user equipment to receive, from a base station, configuration information indicating a set of component carriers (CCs) associated with the UE. The processor-readable code, when executed by the at least one processor, may be configured to cause the user equipment to receive, from the base station, a message that activates or deactivates one or more CCs of the set of CCs. The processor-readable code, when executed by the at least one processor, may be configured to cause the user equipment to communicate, with the base station, after receiving the message, using one or more activated CCs of the set of CCs over a tuned radio frequency (RF) bandwidth that is based on receiving the message and based on the one or more activated CCs.

Some aspects described herein relate to a method of wireless communication performed by a UE. The method may include receiving, from a base station, configuration information indicating a set of CCs associated with the UE. The method may include receiving, from the base station, a message that activates or deactivates one or more CCs of the set of CCs. The method may include communicating, with the base station, after receiving the message, using one or more activated CCs of the set of CCs over a tuned RF bandwidth that is based on receiving the message and based on the one or more activated CCs.

Some aspects described herein relate to a non-transitory computer-readable medium that stores a set of instructions for wireless communication by a UE. The set of instructions, when executed by one or more processors of the UE, may cause the UE to receive, from a base station, configuration information indicating a set of CCs associated with the UE. The set of instructions, when executed by one or more processors of the UE, may cause the UE to receive, from the base station, a message that activates or deactivates one or more CCs of the set of CCs. The set of instructions, when executed by one or more processors of the UE, may cause the UE to communicate, with the base station, after receiving the message, using one or more activated CCs of the set of CCs over a tuned RF bandwidth that is based on receiving the message and based on the one or more activated CCs.

Some aspects described herein relate to an apparatus for wireless communication. The apparatus may include means for receiving, from a base station, configuration information indicating a set of CCs associated with the apparatus. The apparatus may include means for receiving, from the base station, a message that activates or deactivates one or more CCs of the set of CCs. The apparatus may include means for communicating, with the base station, after receiving the message, using one or more activated CCs of the set of CCs over a tuned RF bandwidth that is based on receiving the message and based on the one or more activated CCs.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
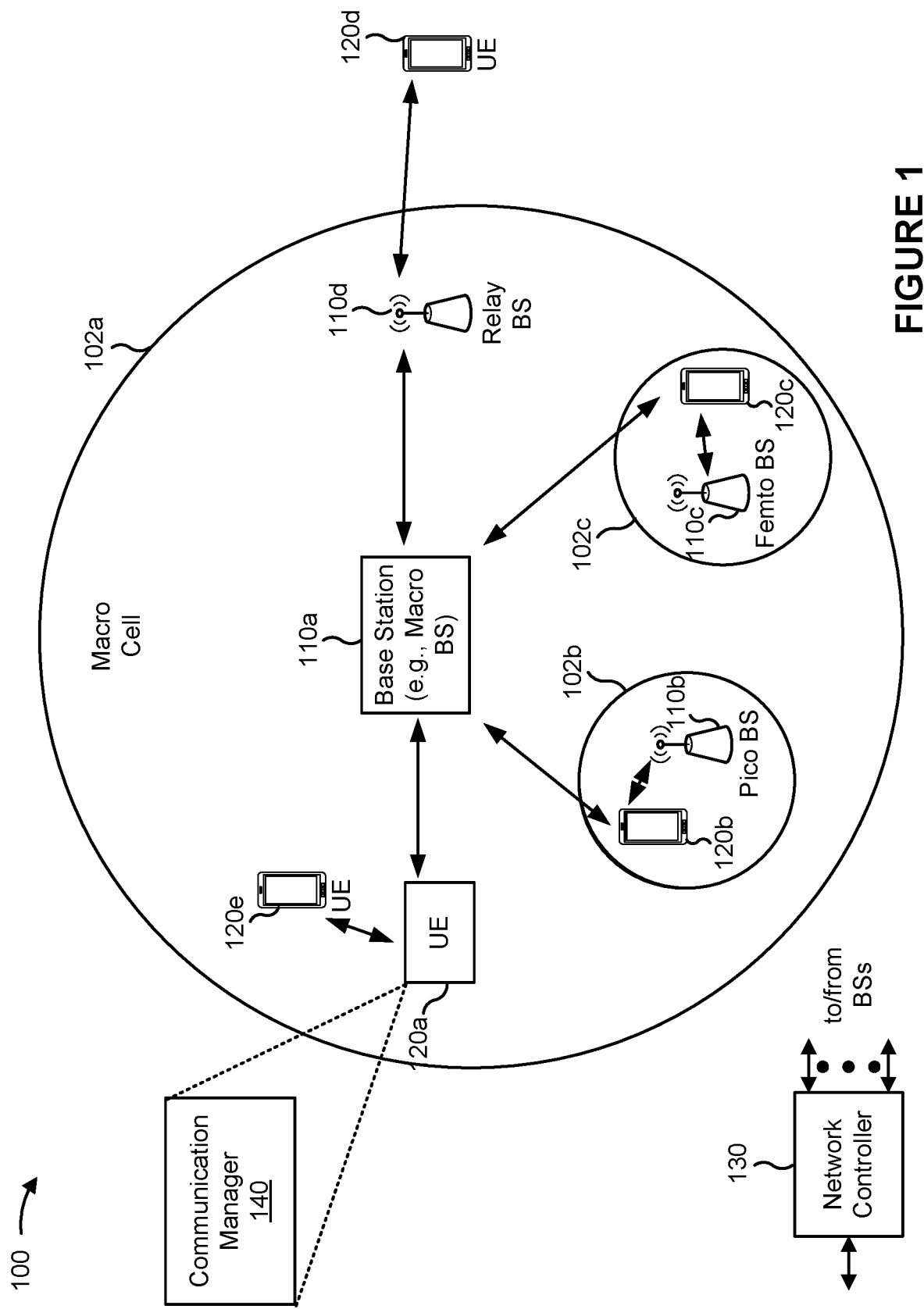
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to optimized component carrier (CC) activation and deactivation. Some aspects more specifically relate to a power optimization of a user equipment (UE) associated with CC activation and deactivation. In some aspects, the UE may tune a radio frequency (RF) bandwidth of the UE based at least in part on receiving a message activating or deactivating one or more CCs (for example, a medium access control (MAC) control element (MAC-CE) activation or deactivation message). For example, the UE may receive a message indicating an activation or deactivation of one or more CCs from a set of radio resource control (RRC)-configured CCs. The message may indicate one or more CCs, from the set of RRC-configured CCs, that are activated for the UE. The UE may tune the RF bandwidth used by the UE based at least in part on the one or more CCs that are activated for the UE. In other words, the UE may modify or tune the RF bandwidth used by the UE after receiving the message that activates or deactivates the one or more CCs (for example, rather than after receiving the RRC configuration that configures the set of CCs). For example, the UE may tune the RF bandwidth used by the UE to cover a frequency range associated with the one or more CCs that are activated for the UE but not any deactivated CCs. Therefore, the RF bandwidth may be narrower than the range of frequencies associated with set of RRC-configured CCs.

In some aspects, the UE may use a script (for example, a set of instructions or code) to cause the RF bandwidth to be modified to a given range of frequencies. For example, the script, when executed by a processor of the UE, may cause the UE to modify or tune the RF bandwidth to a given range of frequencies. In some aspects, the UE may generate one or more scripts based at least in part on the set of RRC-configured CCs. For example, to comply with latency or delay requirements associated with activating or deactivating CCs, the UE may generate the one or more scripts in advance of receiving an activation or deactivation message. In some aspects, the UE may generate a script for each possible combination of CCs from the set of RRC-configured CCs. In some other aspects, the UE may generate scripts for only a subset of the possible combinations of CCs from the set of RRC-configured CCs. The UE may store the scripts generated after receiving the RRC configuration such that, after subsequently receiving an activation or deactivation message, the UE may select and execute a script, from the stored scripts, to cause the RF bandwidth to be modified or tuned, as described in more detail elsewhere herein. For example, the UE may select a script that causes the UE to modify the RF bandwidth to cover a range of frequencies associated with CCs that are currently activated for the UE.

Particular aspects of the subject matter described in this disclosure can be implemented to realize one or more of the following potential advantages. In some examples, the described techniques can be used to conserve power resources of a UE. For example, by modifying or tuning an RF bandwidth after receiving a message that activates or deactivates one or more CCs, the UE may conserve power resources that would have otherwise been used based on the RF bandwidth being tuned based on the RRC-configured CCs (for example, rather than only the activated CCs). In some examples, the UE may reduce a latency or delay associated with activating or deactivating a CC by generating a script associated with modifying or tuning the RF bandwidth after receiving an RRC configuration. The UE may select or execute a generated script after receiving the message that activates or deactivates one or more CCs, thereby conserving time resources that would have otherwise been used to generate the script after receiving the message that activates or deactivates the one or more CCs.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a base station, configuration information indicating a set of CCs associated with the UE 120; receive, from the base station, a message that activates or deactivates one or more CCs of the set of CCs; and communicate, with the base station, after receiving the message, using one or more activated CCs of the set of CCs over a tuned RF bandwidth that is based on receiving the message and based on the one or more activated CCs. Additionally or alternatively, the communication manager 140 may perform one or more other operations described herein.

Figure 2:
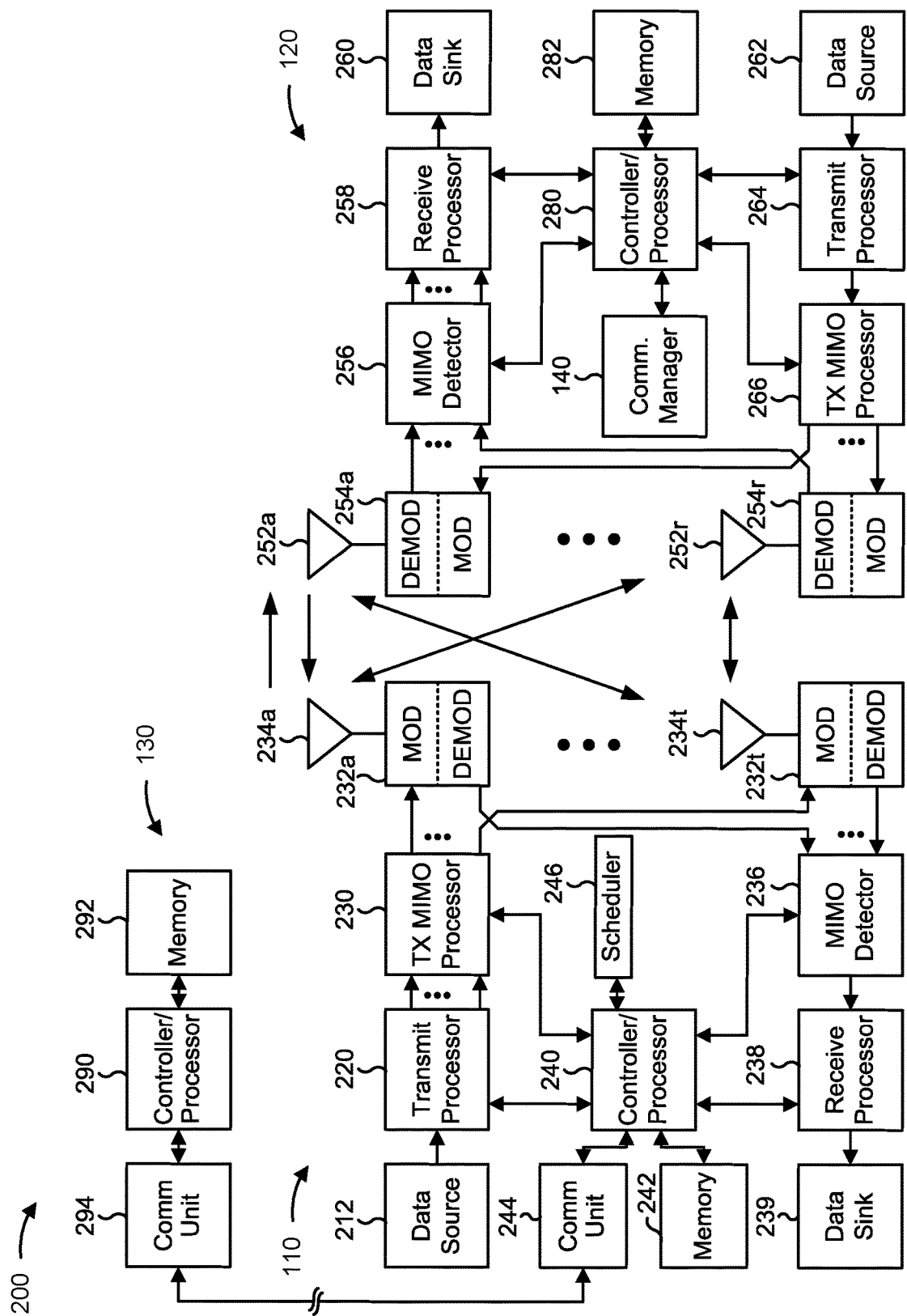
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with optimized CC activation and deactivation, as described in more detail elsewhere herein. For example, the controller/processor 240 of the base station 110, the controller/processor 280 of the UE 120, or any other component(s) of FIG. 2 may perform or direct operations of, for example, process 600 of FIG. 6, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 600 of FIG. 6, or other processes as described herein. In some examples, executing instructions may include running the instructions, converting the instructions, compiling the instructions, or interpreting the instructions, among other examples.

In some aspects, the UE 120 includes means for receiving, from a base station, configuration information indicating a set of CCs associated with the UE 120; means for receiving, from the base station, a message that activates or deactivates one or more CCs of the set of CCs; or means for communicating, with the base station, after receiving the message, using one or more activated CCs of the set of CCs over a tuned RF bandwidth that is based on receiving the message and based on the one or more activated CCs, among other examples. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 3:
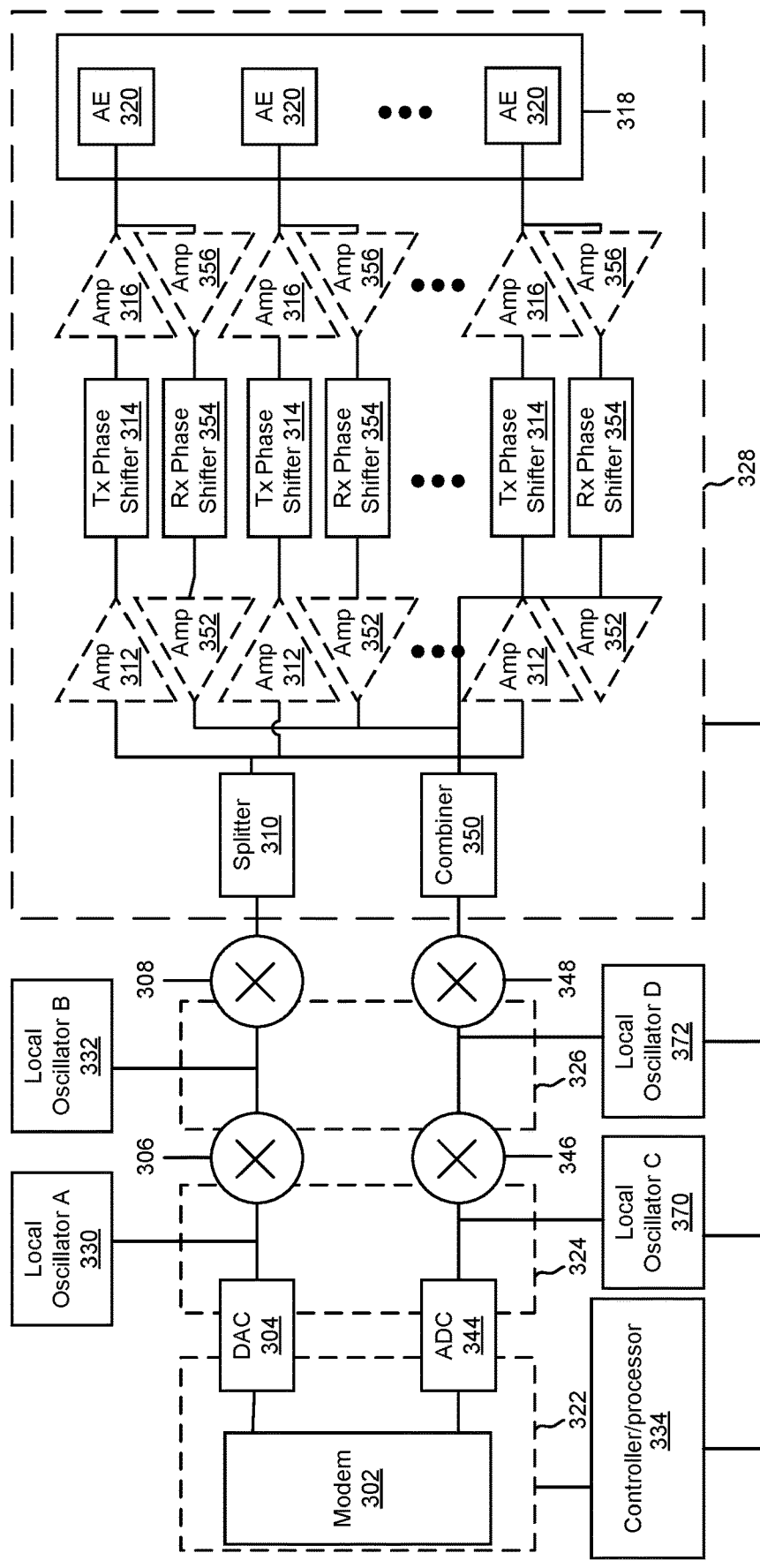
FIG. 3 is a diagram illustrating an example beamforming architecture that supports beamforming for millimeter wave (mmW) communications, in accordance with the present disclosure.

FIG. 3 is a diagram illustrating an example beamforming architecture 300 that supports beamforming for millimeter wave (mmW) communications, in accordance with the present disclosure. In some examples, architecture 300 may implement examples of wireless network 100. In some examples, architecture 300 may be implemented in a transmitting device (for example, a first wireless communication device, UE, or base station) or a receiving device (for example, a second wireless communication device, UE, or base station), as described herein.

Broadly, FIG. 3 is a diagram illustrating example hardware components of a wireless communication device in accordance with some aspects of the disclosure. The illustrated components may include those that may be used for antenna element selection or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320. In some examples, the modem 302 may be one or more of the modems 232 or modems 254 described in connection with FIG. 2.

Transmission lines or other waveguides, wires, or traces are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog RF signals travel or are processed. The architecture also includes a local oscillator A 330, a local oscillator B 332, and a controller/processor 334. In some aspects, controller/processor 334 corresponds to controller/processor 240 of the base station described above in connection with FIG. 2 or controller/processor 280 of the UE described above in connection with FIG. 2.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (for example, to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 or the controller/processor 334 may adjust the frequency of local oscillator A 330 or the local oscillator B 332 so that a desired IF or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be needed in some examples. In some examples, both the first amplifier 312 and second amplifier 316 are present. In some other examples, neither the first amplifier 312 nor the second amplifier 316 is present. In some other examples, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude or suppress radiation of the signal by a specific antenna element. Each of the amplifiers 312, 316 may be controlled independently (for example, by the modem 302 or the controller/processor 334) to provide independent control of the gain for each antenna element 320. For example, the modem 302 or the controller/processor 334 may have at least one control line connected to each of the splitter 310, first amplifiers 312, phase shifters 314, or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be independently set to provide a desired amount of phase shift or the same amount of phase shift or some other configuration. The modem 302 or the controller/processor 334 may have at least one control line connected to each of the phase shifters 314 and which may be used to configure the phase shifters 314 to provide a desired amount of phase shift or phase offset between antenna elements 320.

In the illustrated architecture 300, RF signals received by the antenna elements 320 are provided to one or more first amplifiers 356 to boost the signal strength. The first amplifiers 356 may be connected to the same antenna arrays 318 (for example, for time division duplex (TDD) operations). The first amplifiers 356 may be connected to different antenna arrays 318. The boosted RF signal is input into one or more phase shifters 354 to provide a configurable phase shift or phase offset for the corresponding received RF signal to enable reception via one or more receive (Rx) beams. The phase shifter 354 may be an active phase shifter or a passive phase shifter. The settings of the phase shifters 354 are independent, meaning that each can be independently set to provide a desired amount of phase shift or the same amount of phase shift or some other configuration. The modem 302 or the controller/processor 334 may have at least one control line connected to each of the phase shifters 354 and which may be used to configure the phase shifters 354 to provide a desired amount of phase shift or phase offset between antenna elements 320 to enable reception via one or more Rx beams.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 or 356 are illustrated in dashed lines because they might not be needed in some examples. In some examples, both the amplifier 352 and the amplifier 356 are present. In another aspect, neither the amplifier 352 nor the amplifier 356 are present. In other examples, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (for example, not connected to a power source), which may result in some insertion loss. The combiner 350 may be an active combiner (for example, connected to a power source), which may result in some signal gain. When combiner 350 is an active combiner, it may provide a different (for example, configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to digital signals. The digital signals output from ADC 344 are input to modem 302 for baseband processing, such as decoding, de-interleaving, or similar operations.

The architecture 300 is given by way of example only to illustrate an architecture for transmitting or receiving signals. In some cases, the architecture 300 or each portion of the architecture 300 may be repeated multiple times within an architecture to accommodate or provide an arbitrary quantity of RF chains, antenna elements, or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (for example, represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification or phase shifts may also take place at different frequencies. For example, in some examples, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first or second amplifiers 312, 316. By way of another example, a phase shift may be implemented by the second mixer 308 to obviate the need for a separate phase shifter 314. This technique is sometimes called local oscillator (LO) phase shifting. In some examples of this configuration, there may be multiple IF to RF mixers (for example, for each antenna element chain) within the second mixer 308, and the local oscillator B 332 may supply different local oscillator signals (with different phase offsets) to each IF to RF mixer.

The modem 302 or the controller/processor 334 may control one or more of the other components 304 through 372 to select one or more antenna elements 320 or to form beams for transmission of one or more signals. For example, the antenna elements 320 may be individually selected or deselected for transmission of a signal (or signals) by controlling an amplitude of one or more corresponding amplifiers, such as the first amplifiers 312 or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The controller/processor 334 may be located partially or fully within one or more other components of the architecture 300. For example, the controller/processor 334 may be located within the modem 302 in some examples.

In some examples, components of the architecture 300 may be tuned or configured to transmit, receive, or process signals at a desired frequency. For example, filters, mixers, splitters, amplifiers, phase shifters and other components may be tuned or configured to receive, transmit, or process signals at a desired frequency (or frequency range). For example, components in areas indicated by reference numbers 328, 326, or 324 may be tuned or configured to transmit, receive, or process RF signals at a desired frequency or frequency range. In some examples, components of the architecture 300 may be tuned or configured to transmit, receive, or process RF signals, baseband signals, or IF signals using different frequencies or different frequency ranges. For example, components of the architecture 300 may be tuned or configured to transmit, receive, or process RF signals associated with a first range of frequencies. Components of the architecture 300 may be tuned or configured to transmit, receive, or process baseband signals associated with a second range of frequencies. The second range of frequencies may be a subset of the first range of frequencies. For example, components of the architecture 300 may be tuned or configured to transmit, receive, or process baseband signals over a smaller range of frequencies (compared to a range of frequencies at which the components of the architecture 300 are tuned or configured to transmit, receive, or process RF signals) to conserve power. For example, components of the architecture 300 may be tuned to transmit, receive, or process RF signals over an 800 megahertz (MHz) frequency range and the components of the architecture 300 may be tuned to transmit, receive, or process baseband signals over a subset of frequencies (such as 100 MHz) of the 800 MHz frequency range. As a result, the UE may be capable of transmitting or receiving RF signals over a frequency range, but the UE may only process signals (baseband signals) over a subset of frequencies of the frequency range.

As used herein, "tuning" may refer to configuring or modifying components (such as the components of the architecture 300 or components depicted and described in FIG. 2) to transmit, receive, or process signals for a desired frequency or frequency range. For example, "RF tuning" may refer to configuring or modifying components to transmit, receive, or process RF signals for a desired frequency or frequency range. "Tune an RF bandwidth" may be used interchangeably with "modify an RF bandwidth" herein. As used herein, "RF bandwidth" may refer to a range of frequencies over which components of a UE are tuned or configured to receive RF signals. "Baseband bandwidth" may refer to a range of frequencies over which components of a UE are tuned or configured to receive baseband signals.

Figure 4:
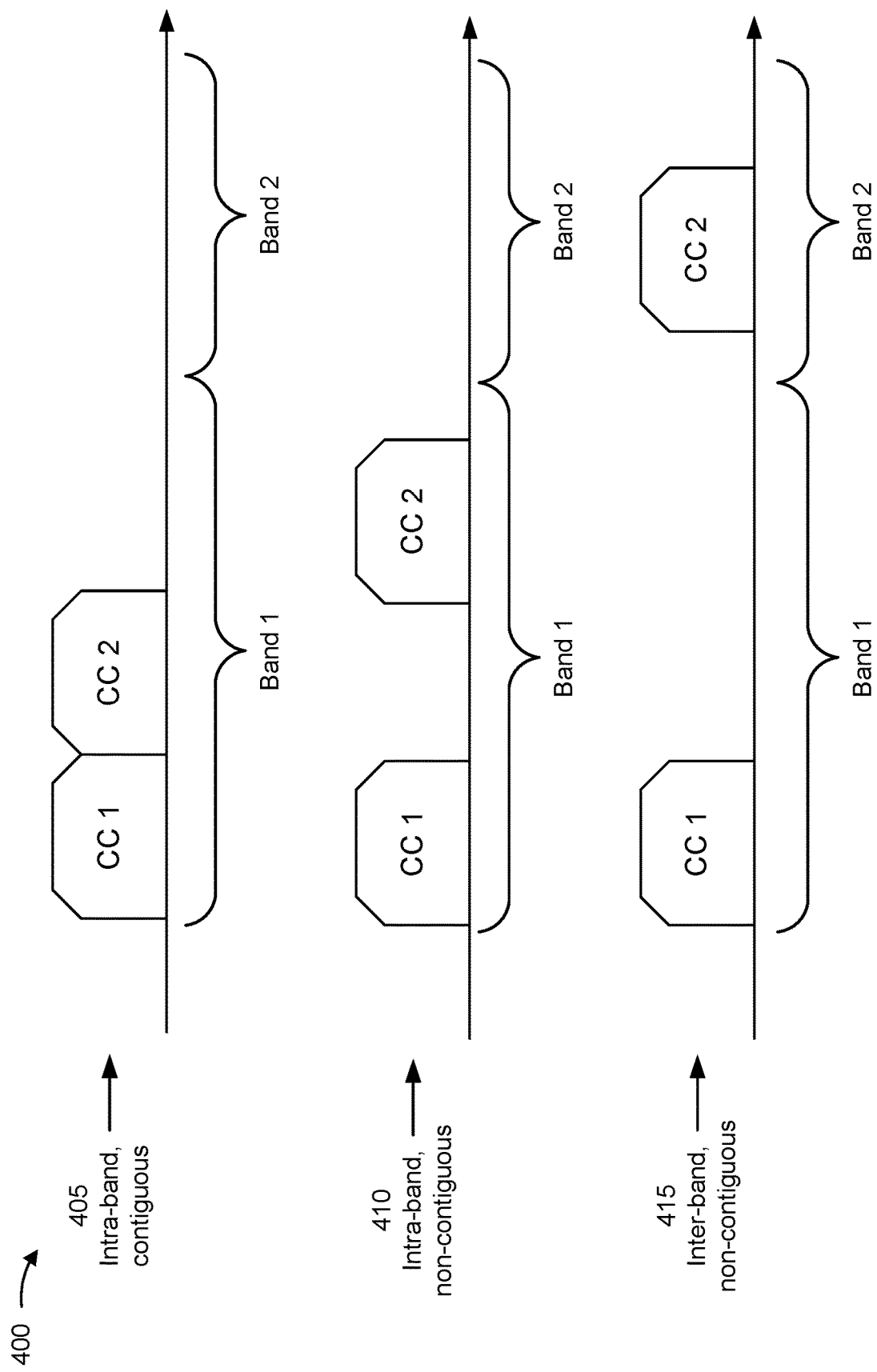
FIG. 4 is a diagram illustrating examples of carrier aggregation, in accordance with the present disclosure.

FIG. 4 is a diagram illustrating examples of carrier aggregation 400, in accordance with the present disclosure. Carrier aggregation is a technology that enables two or more CCs (sometimes referred to as carriers) to be combined (for example, into a single channel) for a single UE 120 to enhance data capacity. As shown, carriers can be combined in the same or different frequency bands. Additionally or alternatively, contiguous or non-contiguous carriers can be combined. A base station 110 may configure carrier aggregation for a UE 120, such as in an RRC message, or another signaling message.

For example, a base station 110 may transmit, and the UE 120 may receive, an RRC configuration indicating a set of CCs. The set of CCs may be CCs that are configured for the UE 120. In some examples, only a primary CC may be activated based on the RRC configuration. The base station 110 may dynamically activate or deactivate other CCs, from the set of CCs, based on scheduling needs, a traffic load, or other considerations. For example, the base station 110 may transmit, and the UE 120 may receive, a MAC-CE message that activates or deactivates one or more CCs from the set of RRC configured CCs. This enables the base station 110 to dynamically add or remove CCs to handle varying traffic loads at the UE 120. An "activated" CC may be a CC that carries data and a "deactivated" CC may be a CC that is configured, but that does not carry data.

In some examples, carrier aggregation may be configured in an intra-band contiguous mode 405 where the aggregated carriers are contiguous to one another and are in the same band. In some examples, carrier aggregation may be configured in an intra-band non-contiguous mode 410 where the aggregated carriers are non-contiguous to one another and are in the same band. In some examples, carrier aggregation may be configured in an inter-band non-contiguous mode 415 where the aggregated carriers are non-contiguous to one another and are in different bands.

In carrier aggregation, a UE 120 may be configured with a primary carrier or primary cell (PCell) and one or more secondary carriers or secondary cells (SCells). A CC associated with a PCell may be referred to as a primary CC (PCC). A CC associated with an SCell may be referred to as a secondary CC (SCC). In some examples, the primary carrier (for example, the PCC) may carry control information (for example, downlink control information or scheduling information) for scheduling data communications on one or more secondary carriers (for example, one or more SCCs), which may be referred to as cross-carrier scheduling. In some examples, a carrier (for example, a primary carrier or a secondary carrier) may carry control information for scheduling data communications on the carrier, which may be referred to as self-carrier scheduling or carrier self-scheduling.

In some examples, the UE 120 may tune or configure components (such as components depicted and described in connection with FIGS. 2 and 3) based on the CCs configured for the UE 120. For example, an RRC configuration may indicate a set of CCs. The set of CCs may span a range of frequencies. For example, if 8 CCs are configured and each CC spans 100 MHz, the range of frequencies may be 800 MHz, assuming the CCs are consecutive or contiguous. Based on receiving the RRC configuration, the UE 120 may tune or configure components of the UE 120 to transmit, receive, or process RF signals over the range of frequencies associated with the RRC configured CCs. For example, the UE 120 may tune or configure an RF bandwidth based on the range of frequencies associated with the RRC configured CCs (for example, after or near the time when the RRC configuration is received by the UE 120). However, as described above, only some CCs, from the RRC configured CCs, may be activated at a given time. In some examples, the UE 120 may tune or configure components of the UE 120 to transmit, receive, or process baseband signals based on the range of frequencies associated with the RRC configured CCs. In some other examples, the UE 120 may tune or configure components of the UE 120 to transmit, receive, or process baseband signals based on the range of frequencies associated with the activated CCs (for example, to conserve power because the deactivated CCs do not carry data and therefore baseband signals associated with the deactivated CCs do not need to be processed by the UE 120).

Therefore, in some cases, an RF bandwidth of the UE 120 may be tuned or configured based on the RRC configured CCs. For example, in some cases, the UE 120 may perform cell search or measurement operations associated with one or more deactivated CCs. Therefore, the UE 120 may configure or tune the RF bandwidth to cover a frequency range associated with all RRC configured CCs (for example, to ensure that the UE 120 is capable of transmitting, receiving, or processing RF signals associated with all RRC configured CCs). However, this consumes significant power resources of the UE 120. For example, tuning or configuring components of the UE 120 to transmit, receive, or process RF signals over a wider range of frequencies consumes additional power resources as compared to tuning or configuring the components to transmit, receive, or process RF signals over a narrower range of frequencies. For example, tuning or configuring components of the UE 120 to transmit, receive, or process RF signals over a wider range of frequencies consumes additional power resources for analog-to-digital conversion, wideband processing, narrowband processing, or other operations associated with transmitting, receiving, or processing RF signals. As a result, tuning or configuring the RF bandwidth of the UE 120 based on the RRC configured CCs consumes significant power resources of the UE 120.

Various aspects relate generally to optimized CC activation and deactivation. Some aspects more specifically relate to a power optimization of a UE associated with CC activation and deactivation. In some aspects, the UE may tune an RF bandwidth of the UE based at least in part on receiving a message activating or deactivating one or more CCs (for example, a MAC-CE activation or deactivation message). For example, the UE may receive a message indicating an activation or deactivation of one or more CCs from a set of RRC configured CCs. The message may indicate one or more CCs, from the set of RRC configured CCs, that are activated for the UE. The UE may tune the RF bandwidth used by the UE based at least in part on the one or more CCs that are activated for the UE. In other words, the UE may modify or tune the RF bandwidth used by the UE after receiving the message that activates or deactivates the one or more CCs (for example, rather than after receiving the RRC configuration that configures the set of CCs). For example, the UE may tune the RF bandwidth used by the UE to cover a frequency range associated with the one or more CCs that are activated for the UE but not any deactivated CCs. Therefore, the RF bandwidth may be narrower than the range of frequencies associated with set of RRC configured CCs.

In some aspects, the UE may use a script (for example, a set of instructions or code) to cause the RF bandwidth to be modified to a given range of frequencies. For example, the script, when executed by a processor of the UE, may cause the UE to modify or tune the RF bandwidth to a given range of frequencies. In some aspects, the UE may generate one or more scripts based at least in part on the set of RRC configured CCs. For example, to comply with latency or delay requirements associated with activating or deactivating CCs, the UE may generate the one or more scripts in advance of receiving an activation or deactivation message. In some aspects, the UE may generate a script for each possible combination of CCs from the set of RRC configured CCs. In some other aspects, the UE may generate scripts for only a subset of the possible combinations of CCs from the set of RRC-configured CCs. The UE may store the scripts generated after receiving the RRC configuration such that, after subsequently receiving an activation or deactivation message, the UE may select and execute a script, from the stored scripts, to cause the RF bandwidth to be modified or tuned, as described in more detail elsewhere herein. For example, the UE may select a script that causes the UE to modify the RF bandwidth to cover a range of frequencies associated with CCs that are currently activated for the UE.

Particular aspects of the subject matter described in this disclosure can be implemented to realize one or more of the following potential advantages. In some examples, the described techniques can be used to conserve power resources of a UE. For example, by modifying or tuning an RF bandwidth after receiving a message that activates or deactivates one or more CCs, the UE may conserve power resources that would have otherwise been used based on the RF bandwidth being tuned based on the RRC-configured CCs (for example, rather than only the activated CCs). In some examples, the UE may reduce a latency or delay associated with activating or deactivating a CC by generating a script associated with modifying or tuning the RF bandwidth after receiving an RRC configuration. The UE may select or execute a generated script after receiving the message that activates or deactivates one or more CCs, thereby conserving time resources that would have otherwise been used to generate the script after receiving the message that activates or deactivates the one or more CCs.

Figure 5:
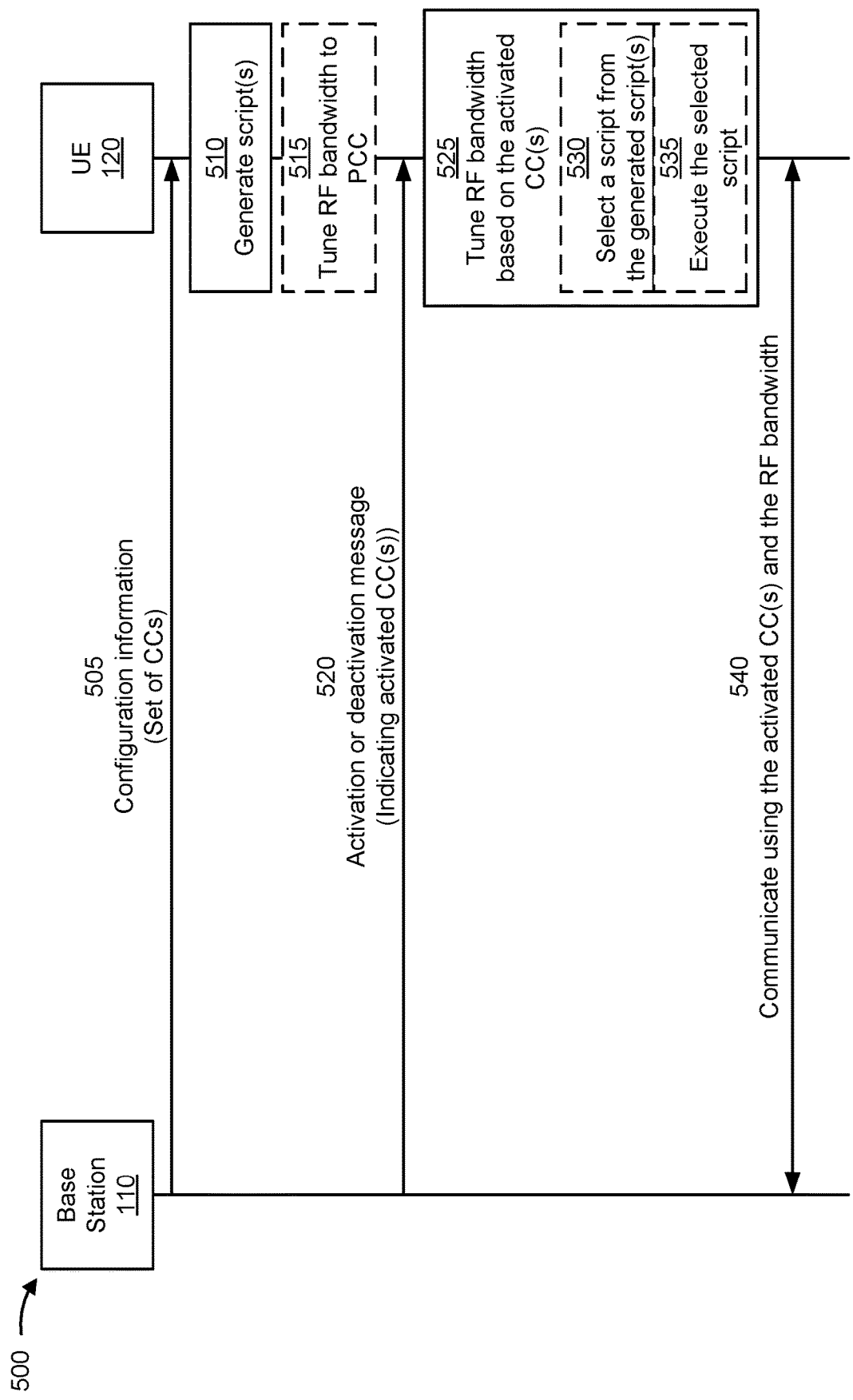
FIG. 5 is a diagram illustrating an example associated with optimized component carrier activation and deactivation, in accordance with the present disclosure.

FIG. 5 is a diagram illustrating an example associated with optimized component carrier activation and deactivation 500, in accordance with the present disclosure. As shown in FIG. 5, a base station 110 and a UE 120 may communicate with one another in a wireless network, such as the wireless network 100. In some aspects, the base station 110 and the UE 120 may communicate with one another using carrier aggregation in a similar manner as described in connection with FIG. 4. For example, in some aspects, the base station 110 and the UE 120 may communicate with one another in an intra-band carrier aggregation mode. In some aspects, the UE 120 and the base station 110 may communicate using a millimeter wave operating band (for example, using frequencies within FR2, FR4, FR4-a or FR4-1, or FR5).

In a first operation 505, the base station 110 may transmit, and the UE 120 may receive, configuration information. In some aspects, the UE 120 may receive configuration information from another device (for example, from another base station or another UE). In some aspects, the UE 120 may receive the configuration information via RRC signaling or MAC signaling (for example, MAC-CE signaling). In some aspects, the configuration information may include an indication of one or more configuration parameters (for example, already known to the UE 120) for selection by the UE 120 or explicit configuration information for the UE 120 to use to configure itself.

In some aspects, the configuration information may indicate that the UE 120 is to operate in a carrier aggregation mode. For example, the configuration information may indicate that the UE 120 is to operate in the intra-band carrier aggregation mode. In some aspects, the intra-band carrier aggregation mode may be an intra-band contiguous mode where the aggregated carriers are contiguous to one another and are in the same band (for example, in a similar manner as described in connection with FIG. 4).

In some aspects, the configuration information may indicate a set of CCs (for example, one or more CCs). For example, the configuration information may indicate a set of CCs that are to be configured for the UE 120. The set of CCs may be CCs that are available to be used for the UE 120. In some aspects, the set of CCs may include a PCC (for example, associated with a PCell) and one or more SCCs (for example, associated with SCells). In some aspects, the configuration information may include information associated with the set of CCs. For example, the configuration information may indicate a frequency band or a range of frequencies associated with each CC included in the set of CCs. For example, in some aspects, the configuration information may indicate that the set of CCs ranges over a frequency range (for example, 800 MHz) and that each CC occupies a subset of the frequency range (for example, each CC occupies 100 MHz of the 800 MHz if there are 8 CCs configured). In some aspects, the configuration information may indicate a cell or identifier associated with each CC included in the set of CCs. The configuration information may configure 2, 4, 8, 16, or another quantity of CCs.

In some aspects, the configuration information may indicate that one or more CCs, from the set of CCs, are to be activated for the UE 120. For example, in some aspects, the configuration information may indicate that a PCC, from the set of CCs, is to be activated for the UE 120. In some aspects, the configuration information may indicate that other CCs, from the set of CCs, may be activated or deactivated by the base station 110 at a later time. For example, the configuration information may be transmitted via RRC signaling. The configuration information may indicate that CCs, from the set of CCs, may be activated or deactivated by the base station 110 via MAC-CE signaling (for example, after the UE 120 is configured with the set of CCs). In other words, the UE 120 may be configured with the set of CCs (for example, via the configuration information) and the base station 110 may dynamically activate or deactivate one or more CCs from the configured CCs (for example, using MAC-CE signaling).

In some aspects, the UE 120 may configure the UE 120 for communicating with the base station 110. In some aspects, the UE 120 may configure the UE 120 based at least in part on the configuration information. In some aspects, the UE 120 may be configured to perform one or more operations described herein. For example, the UE 120 may configure itself to operate using carrier aggregation. In some aspects, the UE 120 may configure itself with the set of CCs indicated by the configuration information. For example, the UE 120 may store information associated with the set of CCs indicated by the configuration information to enable CCs included in the set of CCs to be activated or deactivated at a later time (for example, based at least in part on receiving MAC-CE signaling from the base station 110).

In some aspects, in a second operation 510, the UE 120 may generate one or more scripts based at least in part on receiving the configuration information. As described elsewhere herein, "script" may refer to code, processor-readable code, executable code, a set of instructions, an instruction set, or other information that, when executed by a processor (for example, of the UE 120), causes the UE 120 to perform an action. As used herein, a script may be RF scripts that, when executed by the UE 120, cause the UE to tune an RF bandwidth of the UE 120 to a given frequency range. For example, a script, when executed by the UE 120, may cause the UE 120 to tune or configure one or more components of the UE 120 to transmit, receive, or process RF signals over a given frequency range. As used herein, a script being "associated" with a CC or a combination of CCs may refer to a script that, when executed by the UE 120, causes the UE 120 to tune the RF bandwidth of the UE 120 to span a range of frequencies associated with the CC or the combination of CCs.

In some aspects, the UE 120 may generate multiple scripts based at least in part on the configuration information. For example, the UE 120 may generate multiple scripts based at least in part on the set of CCs indicated by the configuration information. In some aspects, the UE 120 may generate one or more scripts, that when executed by the UE 120, cause the UE 120 to tune the RF bandwidth to different frequency ranges associated with the set of CCs indicated by the configuration information. The UE 120 may store the generated script(s) to enable the UE 120 to select and execute a script after receiving an activation or deactivation message (for example, to quickly tune the RF bandwidth after receiving the activation or deactivation of one or more CCs).

For example, the set of CCs may be associated with a set of combinations of CCs. In other words, there may be N possible combinations of CCs from the set of CCs configured on the UE 120. In some aspects, the UE 120 may generate a script associated with each possible combination of CCs. For example, the UE 120 may generate N scripts. A script associated with a combination of CCs may, when executed by the UE 120, cause the UE 120 to tune the RF bandwidth of the UE 120 to be equal to or greater than a range of frequencies associated with the combination of CCs. The UE 120 may generate a respect script (for example, respective code) associated with one or more CCs, or a combination of CCs, from the RRC configured CCs. For example, if a combination of CCs spans a range of 400 MHz, a script associated with the combination of CCs may, when executed by the UE 120, cause the UE 120 to tune the RF bandwidth of the UE 120 to be equal to or greater than 400 MHz (for example, to enable the UE 120 to transmit, receive, or process RF signals associated with each CC included in the combination of CCs). Generating a script associated with each possible combination of CCs may provide increased flexibility for the UE 120 when tuning the RF bandwidth of the UE 120. This may increase power savings because the UE 120 may be enabled to tune the RF bandwidth to a size that is associated with the activated CCs for the UE 120. In other words, the UE 120 may not tune of the RF bandwidth to a larger than needed size because a script associated with each possible combination of CCs has been generated (for example, there may be a script generated or tailored for each CC combination that the UE 120 may experience, resulting in improved flexibility and power savings for the UE 120).

In some aspects, the UE 120 may generate a script associated with a subset of CC combinations from a set of CC combinations. For example, the quantity of scripts generated by the UE 120 may be less than N. For example, the UE 120 may generate a script associated with some combinations of CCs, but not for other combinations of CCs. This may conserve memory resources associated with storing the scripts.

In some aspects, a script generated by the UE 120 may not be associated with a CC or a combination of CCs. Rather, the script generated by the UE 120 may be associated with tuning or modifying the RF bandwidth to a given frequency range. For example, the UE 120 may generate scripts to enable the UE 120 to tune of modify the RF bandwidth to different ranges of frequencies. In some aspects, the UE 120 may generate scripts to enable the UE 120 to tune of modify the RF bandwidth in different intervals, such as 50 MHz, 100 MHz, 200 MHz, 400 MHz, or another interval. For example, if the interval is 100 MHz, the UE 120 may generate a scripts that, when executed by the UE 120, cause the UE 120 to tune the RF bandwidth to 100 MHz, 200 MHz, 300 MHz, 400 MHz, and so on. In some aspects, a quantity of RF scripts generated may be based at least in part on a size of a frequency range associated with the set of RRC configured CCs. For example, if the set of CCs configured by the configuration information spans 800 MHz and the interval is 100 MHz, then the UE 120 may generate 8 scripts to enable the UE 120 to tune the bandwidth to cover all of the RRC configured CCs if needed. As another example, if the set of CCs configured by the configuration information spans 400 MHz and the interval is 100 MHz, then the UE 120 may generate 4 scripts. This may conserve memory resources associated with storing the scripts while still providing flexibility for the UE 120 to quickly tune the RF bandwidth based at least in part on CCs that are activated for the UE 120.

In some aspects, the UE 120 may generate two scripts including a first script associated with the PCC of the set of CCs configured by the base station and second script associated with all CCs included in the set of CCs. For example, if the PCC is associated with a range of 100 MHz and all CCs included in the set of CCs span 800 MHz, then the first script may, when executed by the UE 120, cause the UE 120 to tune the RF bandwidth to the 100 MHz. Similarly, the second script may, when executed by the UE 120, cause the UE 120 to tune the RF bandwidth to the 800 MHz. This may enable the UE 120 to select the first script when only the PCC is activated and to select the second scrip when any SCC is activated. This conserves memory resources associated with storing the scripts while still providing flexibility for the UE 120 to quickly tune the RF bandwidth based at least in part on CCs that are activated for the UE 120.

In some aspects, in a third operation 515, the UE 120 may tune the RF bandwidth of the UE 120 to the range of frequencies associated with the PCC based at least in part on receiving the configuration information. For example, the UE 120 may tune the RF bandwidth of the UE 120 to the range of frequencies associated with CCs, from the set of CCs configured by the base station 110, that are indicated as being activated by the configuration information. In some examples, the PCC (for example, associated with a PCell) may be the only CC that is activated by the configuration information (for example, by the RRC configuration that configures the set of CCs). Therefore, after receiving the configuration information, the UE 120 may tune the RF bandwidth used by the UE 120 to the range of frequencies associated with PCC to enable the UE 120 to transmit, receive, or process RF signals associated with the PCC.

In other words, the UE 120 may tune the RF bandwidth such that frequencies associated with one or more deactivated CCs are not included in the RF bandwidth. For example, the CCs that are configured by the base station 110 may be physically co-located (for example, for millimeter wave or FR2 intra-band carrier aggregation operations). Therefore, the UE 120 may not be required to, or configured to, perform search or measurement operations associated with the deactivated CCs. For example, because the CCs may be physically co-located with the activated CC(s), measurement information for the deactivated CCs may be inferred by the UE 120 or the base station 110 from measurement information associated with the activated CC(s). Therefore, the UE 120 may tune the RF bandwidth such that frequencies associated with one or more deactivated CCs are not included in the RF bandwidth, enabling the UE 120 to operate with a smaller or narrower RF bandwidth. This may conserve power resources of the UE 120 that would have otherwise been used operating using a larger or wider RF bandwidth, as described in more detail elsewhere herein.

In a fourth operation 520, the base station 110 may transmit, and the UE 120 may receive, a message that activates or deactivates one or more CCs from the set of CCs configured by the base station 110. The message may be a CC activation message or a CC deactivation message. In some aspects, the message may be a MAC-CE message. The message may indicate a set of (for example, one or more) CCs that are activated for the UE 120 (for example, "activated CCs").

In a fifth operation 525, the UE 120 may tune the RF bandwidth used by the UE 120 based at least in part on the activated CCs. In other words, the UE 120 may tune the RF bandwidth based at least in part on receiving the message that activates or deactivates one or more CCs from the set of CCs configured by the base station 110. This may enable the UE 120 to tune the RF bandwidth based on which CCs are activated for the UE 120, rather than tuning the RF bandwidth based on the CCs that are configured (for example, RRC configured) for the UE 120. Therefore, in some cases, the RF bandwidth may be tuned to a narrower or smaller bandwidth (for example, when fewer than all CCs configured for the UE 120 are activated), thereby conserving power resources of the UE 120.

In the fifth operation 525, the UE 120 may tune the RF bandwidth used by the UE 120 to span a range of frequencies associated with the activated CCs for the UE 120. For example, the UE 120 may tune the RF bandwidth used by the UE 120 to span a range of frequencies that is equal to or greater than a range of frequencies associated with the activated CCs. This may enable the UE 120 to transmit, receive, or process RF signals associated with the activated CC(s) while also ensuring that the RF bandwidth is not larger than needed.

In some aspects, an activation or deactivation of a CC may be associated with a latency or delay requirement. For example, the latency or delay requirement may be associated with MAC-CE signaling. The latency or delay requirement may indicate a maximum amount of time from when the activation or deactivation message (for example, the MAC-CE message) is received to a time when the activation or deactivation (for example, indicated by the MAC-CE message) is to take effect. In some aspects, the latency or delay requirement may be defined, or otherwise fixed, by a wireless communication standard, such as the 3 GPP. For example, a latency or delay requirement may be defined, or otherwise fixed, for MAC-CE based activation or deactivation, SCell activation or deactivation (for example, SCell addition or release), or CC activation or deactivation, among other examples. For example, the latency or delay requirement may be 3 milliseconds or another amount of time. Tuning or modifying the RF bandwidth within the latency or delay requirement may be difficult because tuning or modifying the RF bandwidth may take more time than is allowed by the latency or delay requirement. Therefore, the UE 120 may rely on the script(s) that were generated in the second operation 510 to tune the RF bandwidth and comply with the latency or delay requirement.

In some aspects, the UE 120 may include multiple antenna panels. The UE 120 may tune the RF bandwidth for each antenna panel associated with the UE 120. In some aspects, the UE 120 may tune the RF bandwidth for each of the multiple antenna panels simultaneously (for example, based at least in part on receiving the message that activates or deactivates one or more CCs, as described in more detail elsewhere herein). In some other aspects, the UE 120 may tune the RF bandwidth for each of the multiple antenna panels individually (for example, based at least in part on receiving the message that activates or deactivates one or more CCs, as described in more detail elsewhere herein). In some aspects, one or more antenna panels of the UE 120 may be in an active state (for example, may be activated for performing communication operations) and one or more antenna panels of the UE 120 may be in a dormant state (for example, may not be activated for performing communication operations). An antenna panel that is in an active state may be referred to as an "activated antenna panel." An antenna panel that is in a dormant state may be referred to as a "deactivated antenna panel." The UE 120 may tune the RF bandwidth for each of the activated antenna panels (for example, for each antenna panel that is in the active state). The UE 120 may not tune the RF bandwidth for antenna panels that are in a dormant state. This may enable the UE 120 to conserve time associated with tuning the RF bandwidth. For example, because the dormant antenna panels may not be immediately used for transmitting or receiving communication so the RF bandwidth for these antenna panels do not need to be immediately tuned after receiving the activation or deactivation message. In some aspects, the UE 120 may tune the RF bandwidth for the dormant antenna panels at a later time (for example, after activating or deactivating the CC(s) indicated by the base station 110). For example, the UE 120 may tune the RF bandwidth for the dormant antenna panels during a next synchronization signal block (SSB) measurement timing configuration (SMTC) window.

The fifth operation 525 may include a sixth operation 530. In the sixth operation 530, the UE 120 may select a script from the generated script(s) (for example, the script(s) that were generated in the second operation 510). The UE 120 may select a script based at least in part on the activated CCs for the UE 120. For example, the UE 120 may select a script that, when executed by the UE 120, causes the UE 120 tune the RF bandwidth to cover a range of frequencies that include the frequencies associated with the activated CCs. Because the scripts are pre-generated or pre-built (for example, before the activation or deactivation message is received by the UE 120), the UE 120 may conserve time associated with tuning or modifying the RF bandwidth after the activation or deactivation message is received by the UE 120, thereby enabling the UE 120 to comply with the latency or delay requirement(s) associated with activating or deactivating the CCs.

In some aspects, the UE 120 may select a script, from the generated scripts, based at least in part on a combination of CCs that are activated for the UE 120. For example, the UE 120 may select a script that is associated with a combination of CCs that are activated for the UE 120 at that time (for example, when the UE 120 generates a script for each possible combination of CCs, as described in more detail elsewhere herein). In some aspects, the UE 120 may select a script based at least in part on a range of frequencies associated with the activated CCs. For example, the UE 120 may select a script that, when executed by the UE 120, causes the UE 120 to tune the RF bandwidth to a size that is equal to or larger than the range of frequencies associated with the activated CCs. In some aspects, the UE 120 may identify a set of scripts that are associated with RF bandwidths that are equal to or larger than the range of frequencies associated with the activated CCs. The UE 120 may select a script, from the set of scripts, that is associated with a smallest or narrowest RF bandwidth from the RF bandwidths that are equal to or larger than the range of frequencies associated with the activated CCs. This may ensure that the RF bandwidth is tuned to a size that allows the UE 120 to transmit, receive, or process RF signals associated with the activated CCs while also ensuring that the RF bandwidth is not larger or wider than needed, thereby conserving power resources of the UE 120.

In some aspects, the fifth operation 525 may include a seventh operation 535. In the seventh operation 535, the UE 120 may execute the selected script. Executing the selected script may cause the UE 120 to tune the RF bandwidth to a given size or range of frequencies. For example, one or more processors of the UE 120 may execute the selected script. This may cause one or more filters, mixers, splitters, amplifiers, phase shifters and other components of the UE 120 to be tuned or configured to receive, transmit, or process RF signals at the given range of frequencies. Therefore, the UE 120 may be enabled to receive, transmit, or process RF signals that are associated with the activated CCs.

Therefore, the UE 120 may be enabled to increase or decrease a size of the RF bandwidth based at least in part on a quantity or combination of CCs that are activated for the UE 120. As a result, the UE 120 may be enabled to operate using a smaller or narrower RF bandwidth in some scenarios, thereby conserving power resources that would have otherwise been used operating using a wider bandwidth (for example, a bandwidth that is wider than needed to receive, transmit, or process RF signals associated with the activated CCs).

The UE 120 may activate or deactivate the CC(s) indicated by the message (for example, the message received in the fourth operation 520) after an amount of time (for example, the amount of time may be associated with the latency or delay requirement(s) described above). Because the UE 120 is enabled to quickly tune the RF bandwidth (for example, using the pre-built or pre-generated scripts), the UE 120 may be enabled to tune the RF bandwidth prior to activating or deactivating the CC(s) indicated by the message.

In an eighth operation 540, the base station 110 and the UE 120 may communicate using the activated CC(s) and the RF bandwidth (for example, the modified RF bandwidth that is based at least in part on the activated CC(s)). As used herein, "communicate" may refer to transmitting or receiving signals. For example, the UE 120 may transmit, receive, or process RF signals associated with the activated CC(s) using the RF bandwidth that is tuned or modified as described in more detail elsewhere herein.

As a result, the UE 120 may operate using an RF bandwidth that is tailored to the CCs that are activated for the UE 120. This may conserve power resources of the UE. For example, by modifying or tuning the RF bandwidth after receiving the message that activates or deactivates one or more CCs, the UE may conserve power resources that would have otherwise been used associated with the RF bandwidth being tuned based on the RRC configured CCs (for example, rather than the activated CCs) because the RF bandwidth that is tuned based on the RRC configured CCs may be larger than the RF bandwidth that is tuned based on the activated CCs in some cases. In some other examples, the UE 120 may reduce a latency or delay associated with activating or deactivating a CC by generating a script associated with modifying or tuning the RF bandwidth after receiving an RRC configuration, as described in more detail elsewhere herein.

Figure 6:
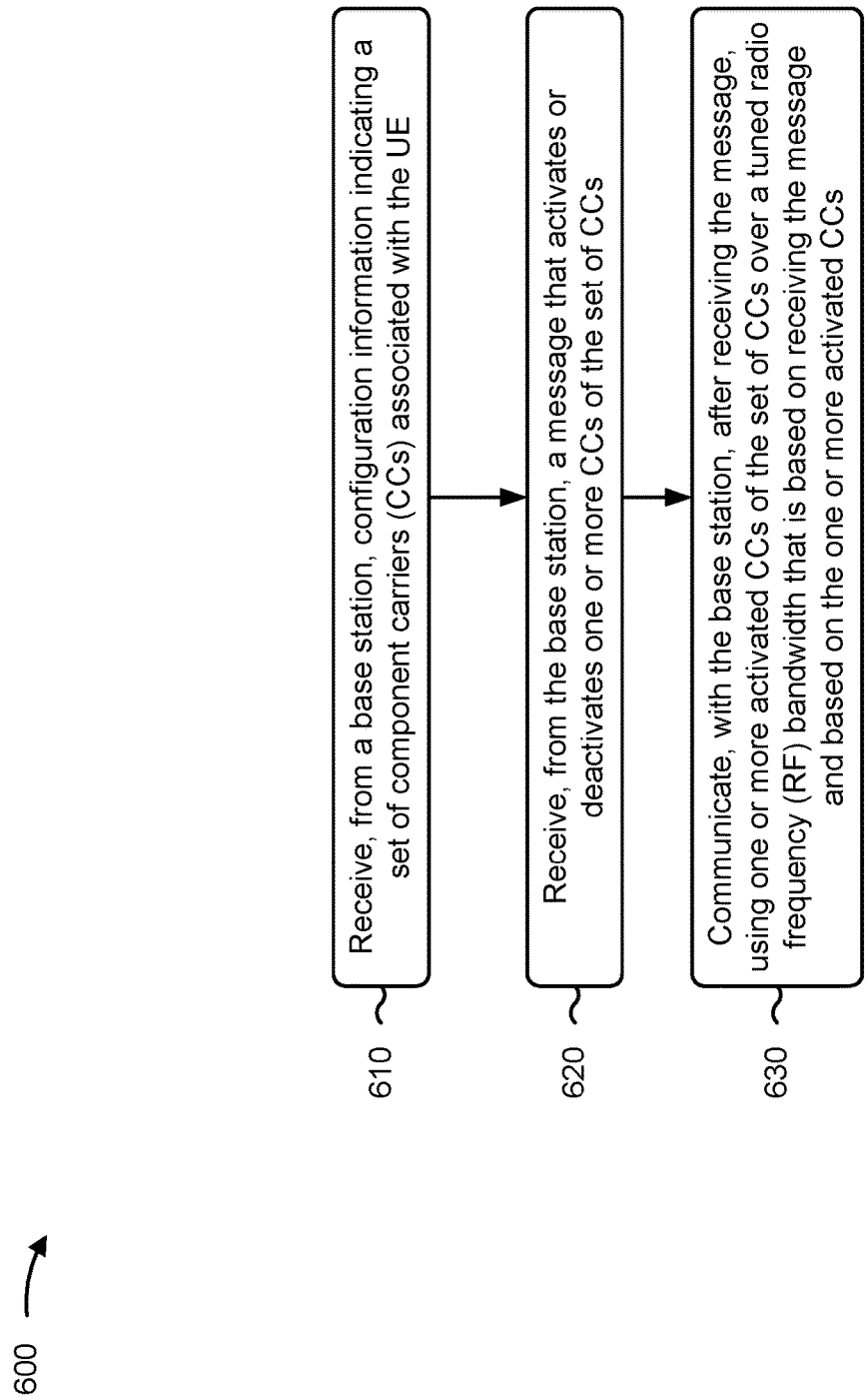
FIG. 6 is a flowchart illustrating an example process performed, for example, by a UE, associated with optimized component carrier activation and deactivation, in accordance with the present disclosure.

FIG. 6 is a flowchart illustrating an example process 600 performed, for example, by a UE, associated with optimized component carrier activation and deactivation, in accordance with the present disclosure. Example process 600 is an example where the UE (for example, UE 120) performs operations associated with optimized component carrier activation and deactivation.

As shown in FIG. 6, in some aspects, process 600 may include receiving, from a base station, configuration information indicating a set of CCs associated with the UE (block 610). For example, the UE (such as by using communication manager 140 or reception component 702, depicted in FIG. 7) may receive, from a base station, configuration information indicating a set of CCs associated with the UE, as described above.

As further shown in FIG. 6, in some aspects, process 600 may include receiving, from the base station, a message that activates or deactivates one or more CCs of the set of CCs (block 620). For example, the UE (such as by using communication manager 140 or reception component 702, depicted in FIG. 7) may receive, from the base station, a message that activates or deactivates one or more CCs of the set of CCs, as described above.

As further shown in FIG. 6, in some aspects, process 600 may include communicating, with the base station, after receiving the message, using one or more activated CCs of the set of CCs over a tuned RF bandwidth that is based on receiving the message and based on the one or more activated CCs (block 630). For example, the UE (such as by using communication manager 140, reception component 702, or transmission component 704, depicted in FIG. 7) may communicate, with the base station, after receiving the message, using one or more activated CCs of the set of CCs over a tuned RF bandwidth that is based on receiving the message and based on the one or more activated CCs, as described above.

Process 600 may include additional aspects, such as any single aspect or any combination of aspects described below or in connection with one or more other processes described elsewhere herein.

In a first additional aspect, receiving the message that activates or deactivates the one or more CCs includes receiving an indication of the one or more activated from the set of CCs, wherein the one or more activated CCs are associated with a range of frequencies, and wherein the RF bandwidth is tuned based at least in part on the range of frequencies.

In a second additional aspect, alone or in combination with the first aspect, receiving the message that activates or deactivates the one or more CCs includes executing code, from a set of codes, that causes the RF bandwidth to be tuned, wherein the set of codes are associated with causing the RF bandwidth to be tuned to different ranges of frequencies.

In a third additional aspect, alone or in combination with one or more of the first and second aspects, process 600 includes generating the set of codes based at least in part on receiving the configuration information.

In a fourth additional aspect, alone or in combination with one or more of the first through third aspects, receiving the message that activates or deactivates the one or more CCs includes receiving an indication of the one or more activated CCs, from the set of CCs, and selecting the code from the set of codes based at least in part on a range of frequencies associated with the one or more activated CCs.

In a fifth additional aspect, alone or in combination with one or more of the first through fourth aspects, the set of CCs are associated with a set of CC combinations, and the set of codes includes respective codes associated with each CC combination included in the set of CC combinations.

In a sixth additional aspect, alone or in combination with one or more of the first through fifth aspects, the set of CCs are associated with a set of CC combinations, and the set of codes includes respective codes associated with a subset of CC combinations of the set of CC combinations.

In a seventh additional aspect, alone or in combination with one or more of the first through sixth aspects, receiving the message that activates or deactivates the one or more CCs includes receiving an indication of a combination of CCs, from the set of CCs, that are activated for the UE, and selecting the code from the set of codes based at least in part on the combination of CCs.

In an eighth additional aspect, alone or in combination with one or more of the first through seventh aspects, the UE is associated with a set of antenna panels, and the RF bandwidth of the UE is tuned for each antenna panel included in the set of antenna panels based at least in part on receiving the message.

In a ninth additional aspect, alone or in combination with one or more of the first through eighth aspects, the UE is associated with a set of antenna panels, and the RF bandwidth of the UE is tuned for a subset of antenna panels, of the set of antenna panels, based at least in part on receiving the message.

In a tenth additional aspect, alone or in combination with one or more of the first through ninth aspects, the subset of antenna panels are activated antenna panels for the UE.

In an eleventh additional aspect, alone or in combination with one or more of the first through tenth aspects, the message is a MAC-CE message.

In a twelfth additional aspect, alone or in combination with one or more of the first through eleventh aspects, the UE is operating in an intra-band carrier aggregation mode.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
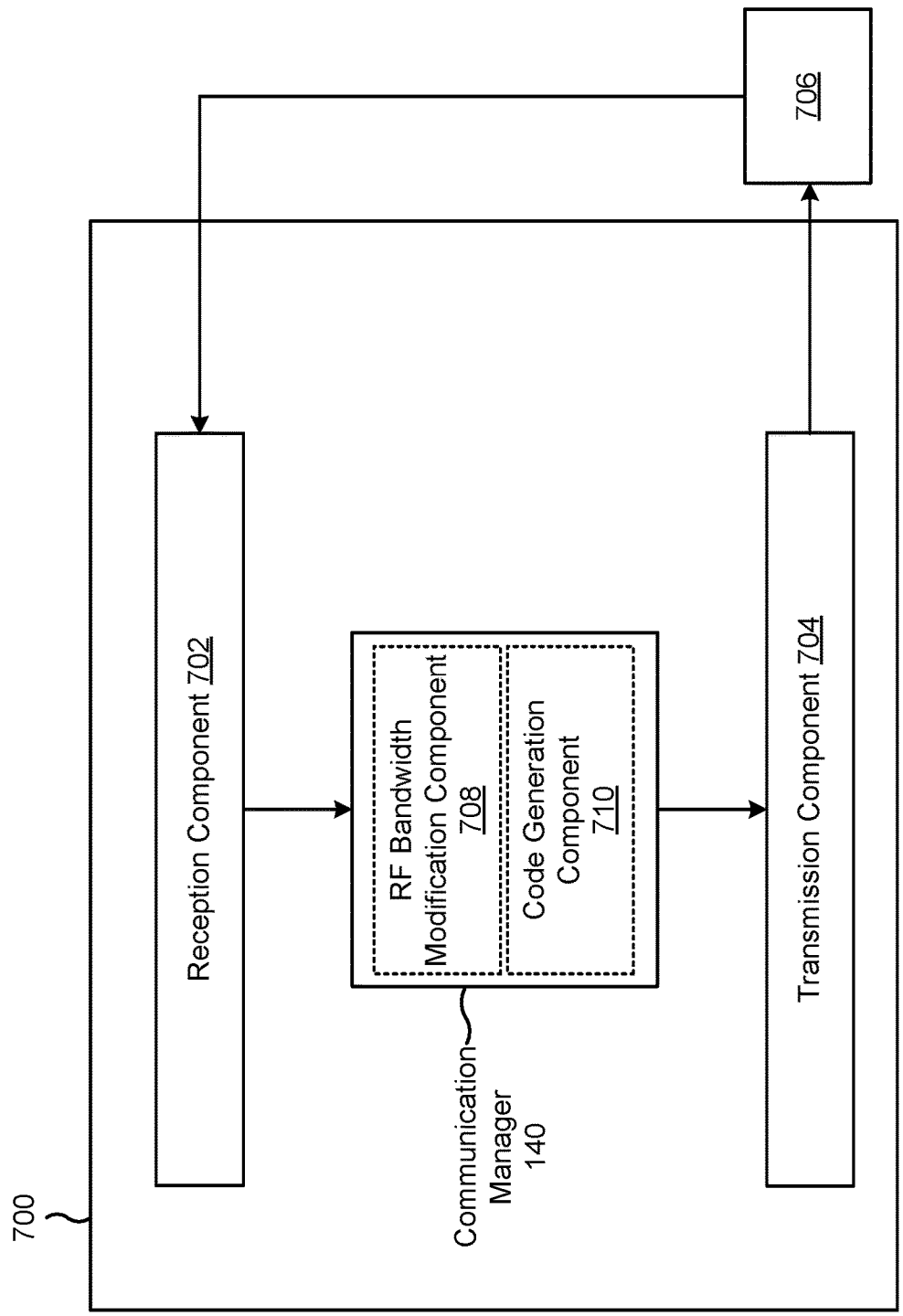
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may perform operations associated with optimized CC activation or deactivation, as described in more detail elsewhere herein. The apparatus 700 may be a UE, or a UE may include the apparatus 700. In some aspects, the apparatus 700 includes a reception component 702, a transmission component 704, and a communication manager 140, which may be in communication with one another (for example, via one or more buses). As shown, the apparatus 700 may communicate with another apparatus 706 (such as a UE, a base station, or another wireless communication device) using the reception component 702 and the transmission component 704.

In some aspects, the apparatus 700 may be configured to perform one or more operations described herein in connection with FIG. 5. Additionally or alternatively, the apparatus 700 may be configured to perform one or more processes described herein, such as process 600 of FIG. 6, or a combination thereof. In some aspects, the apparatus 700 may include one or more components of the UE described above in connection with FIG. 2.

The reception component 702 may receive communications, such as reference signals, control information, data communications, or a combination thereof, from the apparatus 706. The reception component 702 may provide received communications to one or more other components of the apparatus 700, such as the communication manager 140. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a modem, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, the communication manager 140 may generate communications and may transmit the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The communication manager 140 may receive or may cause the reception component 702 to receive, from a base station, configuration information indicating a set of CCs associated with the apparatus 700. The communication manager 140 may receive or may cause the reception component 702 to receive, from the base station, a message that activates or deactivates one or more CCs of the set of CCs. The communication manager 140 may communicate or may cause the reception component 702 or the transmission component 704 to communicate, with the base station, after receiving the message, using one or more activated CCs of the set of CCs over a tuned RF bandwidth that is based on receiving the message and based on the one or more activated CCs. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as an RF bandwidth modification component 708, a code generation component 710, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive, from a base station, configuration information indicating a set of CCs associated with the apparatus 700. The reception component 702 may receive, from the base station, a message that activates or deactivates one or more CCs of the set of CCs. The reception component 702 or the transmission component 704 may communicate, with the base station, after receiving the message, using one or more activated CCs of the set of CCs over a tuned RF bandwidth that is based on receiving the message and based on the one or more activated CCs.

The RF bandwidth modification component 708 may execute code (for example, a script), from a set of codes (for example, from a set of scripts), that causes the RF bandwidth to be tuned, wherein the set of codes are associated with causing the RF bandwidth to be tuned to different ranges of frequencies.

The code generation component 710 may generate the set of codes based at least in part on receiving the configuration information.

The reception component 702 may receive an indication of the one or more activated CCs. The RF bandwidth modification component 708 may select the code from the set of codes based at least in part on a range of frequencies associated with the one or more activated CCs.

The reception component 702 may receive an indication of a combination of CCs, from the set of CCs, that are activated for the apparatus 700. The RF bandwidth modification component 708 may select the code from the set of codes based at least in part on the combination of CCs.

The RF bandwidth modification component 708 may tune the RF bandwidth based at least in part on receiving the message that activates or deactivates one or more CCs of the set of CCs. In some aspects, the RF bandwidth modification component 708 may tune the RF bandwidth after receiving the message that activates or deactivates one or more CCs of the set of CCs.

The quantity and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving, from a base station, configuration information indicating a set of component carriers (CCs) associated with the UE; receiving, from the base station, a message that activates or deactivates one or more CCs of the set of CCs; and communicating, with the base station, after receiving the message, using one or more activated CCs of the set of CCs over a tuned radio frequency (RF) bandwidth that is based on receiving the message and based on the one or more activated CCs.

Aspect 2: The method of Aspect 1, wherein receiving the message that activates or deactivates the one or more CCs comprises receiving an indication of the one or more activated CCs from the set of CCs, wherein the one or more activated CCs are associated with a range of frequencies, and wherein the RF bandwidth is tuned based at least in part on the range of frequencies.

Aspect 3: The method of any of Aspects 1-2, wherein receiving the message that activates or deactivates the one or more CCs comprises executing code, from a set of codes, that causes the RF bandwidth to be tuned, wherein the set of codes are associated with causing the RF bandwidth to be tuned to different ranges of frequencies.

Aspect 4: The method of Aspect 3, further comprising generating the set of codes based at least in part on receiving the configuration information.

Aspect 5: The method of any of Aspects 3-4, wherein receiving the message that activates or deactivates the one or more CCs comprises: receiving an indication of the one or more activated CCs from the set of CCs; and selecting the code from the set of codes based at least in part on a range of frequencies associated with the one or more activated CCs.

Aspect 6: The method of any of Aspects 3-5, wherein the set of CCs are associated with a set of CC combinations, and wherein the set of codes includes respective codes associated with each CC combination included in the set of CC combinations.

Aspect 7: The method of any of Aspects 3-5, wherein the set of CCs are associated with a set of CC combinations, and wherein the set of codes includes respective codes associated with a subset of CC combinations of the set of CC combinations.

Aspect 8: The method of any of Aspects 3-7, wherein receiving the message that activates or deactivates the one or more CCs comprises: receiving an indication of a combination of CCs, from the set of CCs, that are activated for the UE; and selecting the code from the set of codes based at least in part on the combination of CCs.

Aspect 9: The method of any of Aspects 1-8, wherein the UE is associated with a set of antenna panels, and wherein the RF bandwidth of the UE is tuned for each antenna panel included in the set of antenna panels based at least in part on receiving the message.

Aspect 10: The method of any of Aspects 1-8, wherein the UE is associated with a set of antenna panels, and wherein the RF bandwidth of the UE is tuned for a subset of antenna panels, of the set of antenna panels, based at least in part on receiving the message.

Aspect 11: The method of Aspect 10, wherein the subset of antenna panels are activated antenna panels for the UE.

Aspect 12: The method of any of Aspects 1-11, wherein the message is a medium access control (MAC) control element (MAC-CE) message.

Aspect 13: The method of any of Aspects 1-12, wherein the UE is operating in an intra-band carrier aggregation mode.

Aspect 14: An apparatus for wireless communication at a device, comprising a processor; memory coupled with the processor; and instructions stored in the memory and executable by the processor to cause the apparatus to perform the method of one or more of Aspects 1-13.

Aspect 15: A device for wireless communication, comprising a memory and one or more processors coupled to the memory, the one or more processors configured to perform the method of one or more of Aspects 1-13.

Aspect 16: An apparatus for wireless communication, comprising at least one means for performing the method of one or more of Aspects 1-13.

Aspect 17: A non-transitory computer-readable medium storing code for wireless communication, the code comprising instructions executable by a processor to perform the method of one or more of Aspects 1-13.

Aspect 18: A non-transitory computer-readable medium storing a set of instructions for wireless communication, the set of instructions comprising one or more instructions that, when executed by one or more processors of a device, cause the device to perform the method of one or more of Aspects 1-13.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
a processing system that includes one or more processors and one or more memories coupled with the one or more processors, the processing system configured to cause the UE to:
receive, from a network entity, configuration information indicating a set of component carriers (CCs) associated with the UE;
store a set of codes associated with the set of CCs and associated with causing a radio frequency (RF) bandwidth to be modified to different ranges of frequencies;
receive, from the network entity, a message that activates or deactivates one or more CCs of the set of CCs; and
communicate, with the network entity, using one or more activated CCs of the set of CCs over the RF bandwidth that is tuned to one or more frequency ranges associated with the one or more activated CCs using a code, of the set of codes, in response to the message.

2. The UE of claim 1, wherein, to cause the UE to receive the message that activates or deactivates the one or more CCs, the processing system is configured to cause the UE to:
receive an indication of the one or more activated CCs; and
tune the RF bandwidth to the one or more frequency ranges.

3. The UE of claim 1, wherein the processing system is configured to cause the UE to execute the code, of the set of codes, to cause the RF bandwidth to be tuned.

4. The UE of claim 1, wherein the processing system is configured to cause the UE to generate the set of codes based at least in part on the configuration information.

5. The UE of claim 1, wherein, to cause the UE to receive the message that activates or deactivates the one or more CCs, the processing system is configured to cause the UE to:
receive an indication of the one or more activated CCs; and
select the code from the set of codes based at least in part on the one or more frequency ranges associated with the one or more activated CCs.

6. The UE of claim 1, wherein the set of CCs are associated with a set of CC combinations, and wherein the set of codes includes respective codes associated with each CC combination included in the set of CC combinations.

7. The UE of claim 1, wherein the set of CCs are associated with a set of CC combinations, and wherein the set of codes includes respective codes associated with a subset of CC combinations of the set of CC combinations.

8. The UE of claim 1, wherein, to cause the UE to receive the message that activates or deactivates the one or more CCs, the processing system is configured to cause the UE to:
receive an indication of a combination of CCs, from the set of CCs, that are activated for the UE; and
select the code from the set of codes based at least in part on the combination of CCs.

9. The UE of claim 1, wherein the UE is associated with a set of antenna panels, and wherein the RF bandwidth is tuned for each antenna panel included in the set of antenna panels based at least in part on the message.

10. The UE of claim 1, wherein the UE is associated with a set of antenna panels, and wherein the RF bandwidth is tuned for a subset of antenna panels, of the set of antenna panels, based at least in part on the message.

11. The UE of claim 10, wherein the subset of antenna panels are activated antenna panels for the UE.

12. The UE of claim 1, wherein the message is a medium access control (MAC) control element (MAC-CE) message.

13. The UE of claim 1, wherein the UE is operating in an intra-band carrier aggregation mode.

14. A method of wireless communication performed by a user equipment (UE), comprising:
- receiving, from a network entity, configuration information indicating a set of component carriers (CCs) associated with the UE;
- storing a set of codes associated with the set of CCs and associated with causing a radio frequency (RF) bandwidth to be modified to different ranges of frequencies;
- receiving, from the network entity, a message that activates or deactivates one or more CCs of the set of CCs; and
- communicating, with the network entity, using one or more activated CCs of the set of CCs over the RF bandwidth that is tuned to one or more frequency ranges associated with the one or more activated CCs using a code, of the set of codes, in response to the message.

15. The method of claim 14, wherein receiving the message that activates or deactivates the one or more CCs comprises:
- receiving an indication of the one or more activated CCs; and
- tuning the RF bandwidth to the one or more frequency ranges.

16. The method of claim 14, further comprising executing the code, of the set of codes, to cause the RF bandwidth to be tuned.

17. The method of claim 14, further comprising generating the set of codes based at least in part on the configuration information.

18. The method of claim 14, wherein receiving the message that activates or deactivates the one or more CCs comprises:
- receiving an indication of the one or more activated CCs; and
- selecting the code from the set of codes based at least in part on the one or more frequency ranges associated with the one or more activated CCs.

19. The method of claim 14, wherein the set of CCs are associated with a set of CC combinations, and wherein the set of codes includes respective codes associated with each CC combination included in the set of CC combinations.

20. The method of claim 14, wherein the set of CCs are associated with a set of CC combinations, and wherein the set of codes includes respective codes associated with a subset of CC combinations of the set of CC combinations.

21. The method of claim 14, wherein receiving the message that activates or deactivates the one or more CCs comprises:
- receiving an indication of a combination of CCs, from the set of CCs, that are activated for the UE; and
- selecting the code from the set of codes based at least in part on the combination of CCs.

22. The method of claim 14, wherein the UE is associated with a set of antenna panels, and wherein the RF bandwidth is tuned for each antenna panel included in the set of antenna panels based at least in part on receiving the message.

23. The method of claim 14, wherein the UE is associated with a set of antenna panels, and wherein the RF bandwidth is tuned for a subset of antenna panels, of the set of antenna panels, based at least in part on receiving the message.

24. The method of claim 23, wherein the subset of antenna panels are activated antenna panels for the UE.

25. The method of claim 14, wherein the message is a medium access control (MAC) control element (MAC-CE) message.

26. The method of claim 14, wherein the UE is operating in an intra-band carrier aggregation mode.

* * * * *